Aug. 2, 1927. 1,637,769
W. J. ENNISSON
LANDING AND TAKING OFF STATION FOR AIRCRAFT
Filed May 23, 1923
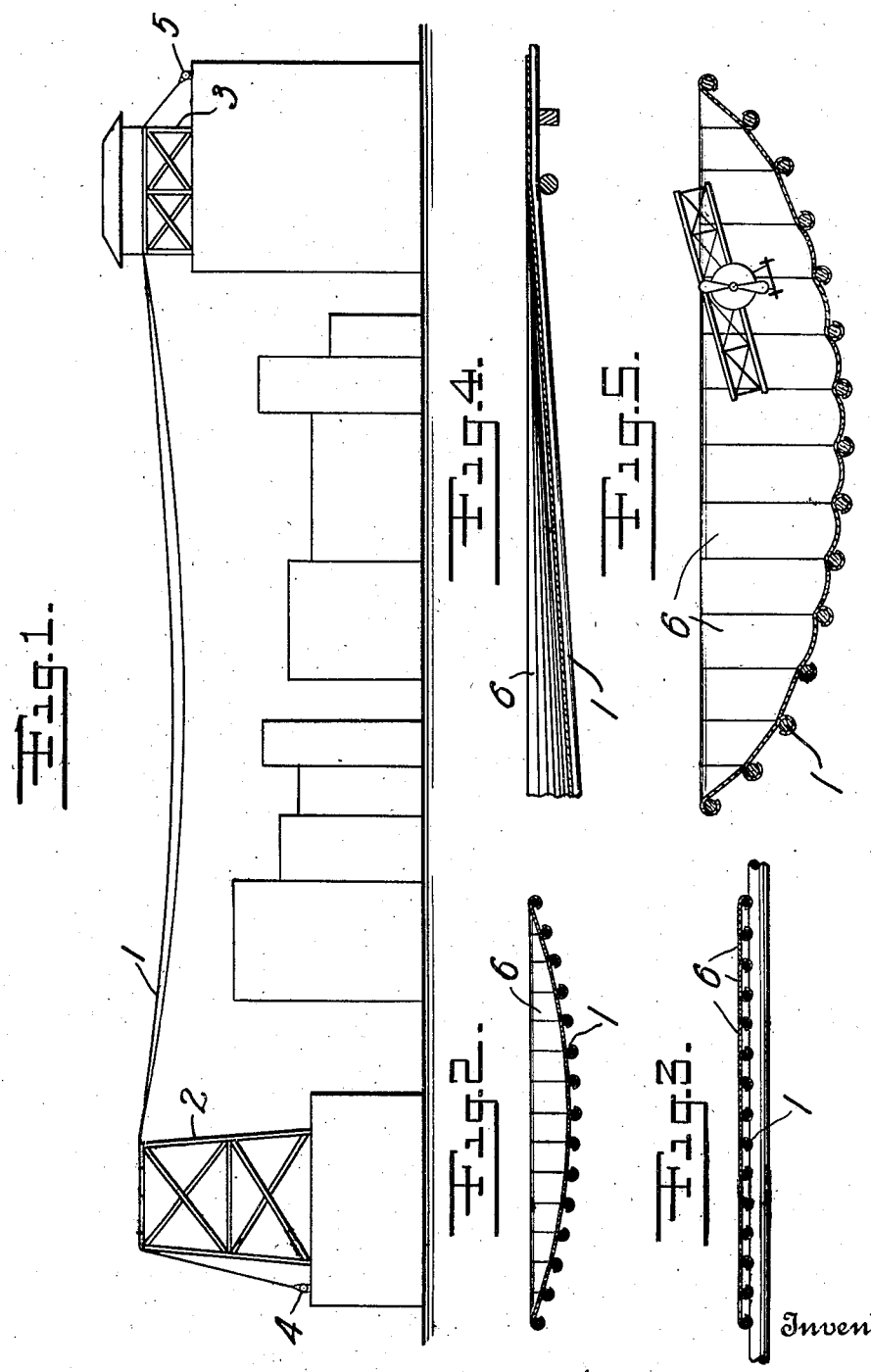
Inventor
W. Jay Ennisson Patented Aug. 2, 1927.

1,637,769

UNITED STATES PATENT OFFICE.

WALTER JAY ENNISSON, OF BROOKLYN, NEW YORK; EDITH A. ENNISSON EXECUTRIX OF SAID WALTER J. ENNISSON, DECEASED.

LANDING AND TAKING-OFF STATION FOR AIRCRAFT.

Application filed May 23, 1923. Serial No. 640,861.

The invention relates to landing and taking off stations for aircraft of the heavier than air type and particularly to stations which can be provided over areas having very irregular surfaces, such as mountainous or built up sections of the country. In my co-pending application, Serial No. 625,329, filed March 15, 1923, a suspended or elevated roadway is provided upon which aircraft may land, and the present invention is in the nature of an improvement upon the device forming the subject matter of that application. An object of the invention is to provide an improved aviation station upon which aircraft may alight and take off easily and safely, regardless of the direction in which the wind may be blowing; which makes possible and feasible the use of aviation stations regardless of the topography of the surface over which they are placed; and which is relatively simple and inexpensive. Other objects and advantages will be apparent from the following description of an embodiment of the invention and the novel features will be particularly pointed out hereinafter in claims.

In the accompanying drawing, Figure 1 is an elevation of a station constructed in accordance with the invention.

Fig. 2 is a transverse section through the same adjacent one end.

Fig. 3 is a transverse section throgh the same at one end.

Fig. 4 is a longitudinal sectional elevation through a portion of the same adjoining one end, and Fig. 5 is a transverse section through the same taken through the central portion.

In the illustrated embodiment of the invention, a plurality of cables 1 are suspended side by side between spaced towers 2 and 3, the ends of the cables passing over the towers and being anchored as at 4 and 5 in any suitable manner. The adjacent cables are connected by a plurality of plates 6 so as to form a continuous roadway supported by the cables upon which aircraft may alight and take off. The cables progressively increase in length from the outer edges inwardly to the central portion, so that the entire roadway will resemble a large hammock. This roadway will be flat at the ends where it passes over the towers and the side portions will be banked outwardly and upwardly from the central portion with the extended banking increasing from each end to the maximum at the center. A few of the cables immediately adjoining the extreme side edges are tightened sufficiently to give a much greater degree of banking at the extreme edges. This change or difference of degree of banking is clearly illustrated in the two sections at each edge as shown in Fig. 5.

This station may be erected in an elevated position regardless of the topography of the surface of the earth over which it is erected. In built up sections of cities the station may be suspended over the roofs of buildings as shown in Fig. 1, and in mountainous regions the station may be suspended over ground having any kind of irregular surface. The aircraft in landing will approach the station from one of the ends, such as the end at tower 2 in Fig. 1, and the length of the roadway is sufficient to enable the aircraft to alight and come to a stop before reaching the other end thereof.

When the wind is in a direction lengthwise of the roadway, little difficulty in landing will be experienced. However, in cases where the direction of the wind is transversely of the roadway, it is difficult for aircraft to alight on a relatively narrow roadway, owing to the side drift of the aircraft by the wind. That is, when the aircraft is moving in the direction along the length of the roadway, the wind will carry the aircraft sidewise to an extent dependent upon the velocity of the wind. By having the sides of the roadway banked, the operator of the aircraft can approach the roadway from one end in the usual manner and when alighting upon the roadway may bank the aircraft slightly by operating suitable banking mechanism of the aircraft in such a manner that the aircraft while being carried sidewise by the wind will alight upon the banked portion of the roadway. In alighting in this manner, the pressure between the alighting aircraft and the roadway will be in a direction normal to the roadway and there will be no tendency to overturning of the aircraft, such as would occur if an aircraft were alighting upon a perfectly flat roadway with a laterally blowing wind. By having the degree of banking vary in the manner explained, the operator of the aircraft may alight at such portion of the banked roadway as will be most suitable, considering the velocity of the laterally blowing wind.

In taking off, the operator of the aircraft will be able by running along the banked portion of the roadway, to get into the air without danger of being carried laterally over the roadway by a laterally blowing wind.

It will be understood that the illustrated embodiment is for the purpose of explaining the principle of the invention and that various changes in the details and arrangements herein described and illustrated may be made within the principle and scope of the invention, as expressed in the appended claims.

Thus, the banked construction of the sides of the roadway is shown sloping upwardly from the central axis zone, whereas obviously the same function would be performed by the reversing or inverting the transverse curvature of the roadway. To accomplish this result, the centrally disposed cables would be shorter than those along the respective side portions of the roadway.

However, in the preferred form of roadway illustrated, the essentials of the lateral banked construction are shown.

Either of the two types of roadway, it will readily be understood, presents two oppositely disposed banked roadways for use in varying wind currents.

I claim:

1. An aviation station comprising a roadway of relatively flat and self sustaining material suspended from spaced points and having a portion of said roadway along a side edge banked upwardly from the central portion.

2. An aviation station comprising a roadway suspended from spaced points and having a portion of said roadway along a side edge banked upwardly from the central portion to different extents, with the greatest degree of banking at the outer edge of the strip.

3. An aviation station comprising a plurality of cables suspended side by side between spaced points, and plates connecting the adjacent cables so as to form a roadway connecting the spaced points and upon which aricraft may alight, the lengths of the cables between said points being longer in the central portion than in the edge portions and becoming progressively shorter on each side of the central portion, whereby the strips along the sides will be banked relatively to the central portion.

4. An aviation station comprising a roadway of relatively flat and self sustaining material extending in a substantially straight direction and having its side edge portions banked upwardly and away from the central portion for at least a portion of the length thereof.

5. An aviation station comprising a roadway of relatively flat and self sustaining material extending in a substantially straight direction with its ends flat and the portion intermediate the ends banked upwardly and outwardly along the side edges.

6. An aviation station comprising a hammock-shaped roadway made from cables and plates of relatively thin, self sustaining material supported thereon.

7. An aviation station comprising a hammock-shaped roadway, the extreme edge strip along each side of the roadway having a greater degree of banking than the remainder of the banked portion.

8. An aviation station comprising a roadway of relatively flat and self sustaining material suspended from spaced supporting members and having oppositely disposed banked edges.

9. An aviation station comprising a roadway of relatively flat and self sustaining material suspended from spaced supporting members and having oppositely disposed side portions sloping outwardly from the central zone of the roadway.

In testimony whereof I have hereunto set my hand.

WALTER JAY ENNISSON.